United States Patent

Matsui

[11] Patent Number: 5,513,047
[45] Date of Patent: Apr. 30, 1996

[54] ACTUATOR FOR AN OPTICAL HEAD

[75] Inventor: Tsutomu Matsui, Tokyo, Japan

[73] Assignee: NEC Corporation, Japan

[21] Appl. No.: 245,476

[22] Filed: May 18, 1994

[30] Foreign Application Priority Data

May 18, 1993 [JP] Japan ................................ 5-115078
Jun. 7, 1993 [JP] Japan ................................ 5-135494

[51] Int. Cl.⁶ .............................. G02B 7/02; G11B 7/00
[52] U.S. Cl. ...................... 359/824; 359/814; 369/44.14; 369/44.17
[58] Field of Search ............................ 359/824, 814; 369/44.14, 44.17, 44.18, 44.21, 44.22

[56] References Cited

U.S. PATENT DOCUMENTS

| | | | |
|---|---|---|---|
| 4,566,089 | 1/1986 | Kime | 369/45 |
| 4,750,164 | 6/1988 | Nose | 359/814 |
| 5,208,703 | 5/1993 | Ikegame et al. | 359/813 |

FOREIGN PATENT DOCUMENTS

| | | |
|---|---|---|
| 176332 | 9/1985 | European Pat. Off. . |
| 287285 | 4/1988 | European Pat. Off. . |
| 440196 | 1/1991 | European Pat. Off. . |
| 178134 | 7/1989 | Japan . |
| 38725 | 2/1992 | Japan . |

OTHER PUBLICATIONS

Patent Abstracts of Japan, vol. 11, No. 389 (P–648) 19 Dec. 1987 & JP–A–62 154 330 Jul. 9, 1987.
Patent Abstracts of Japan, vol. 10, No. 312 (P–509)(2368) 23 Oct. 1986 & JP–A–61 122 941 Jun. 10, 1986.

*Primary Examiner*—Georgia Y. Epps
*Assistant Examiner*—Ricky Mack
*Attorney, Agent, or Firm*—Ostrolenk, Faber, Gerb & Soffen

[57] ABSTRACT

A focus drive coil is wound on an outer periphery of a lens holder, and two tracking drive coils are provided on the focus drive coil. Magnetic chips are preferably interposed between each of the two tracking drive coils. First to third magnets are provided on an actuator base. The first magnet faces the adjacent half portions of the two tracking drive coils, and the second and third magnets face the outer half portion of the two tracking drive coils. The lens holder is supported on the actuator base by using upper and lower parallel triangular plate springs.

9 Claims, 8 Drawing Sheets

5,513,047

ACTUATOR FOR AN OPTICAL HEAD

FIELD OF THE INVENTION

The invention relates to an actuator for an optical head, and more particularly, to an actuator for an objective lens controlled to move in focus and tracking directions with high resolution and high precision.

BACKGROUND OF THE INVENTION

An optical disc apparatus for the next generation is required to operate with a large capacity of information and the high transfer rate information. For this purpose, an objective lens for high resolution recording is used for an optical head, and is required to be controlled with a high speed and the high precision. Therefore, an objective lens actuator to be moved in focus and track directions must be small in size and light in weight, and must generate a driving force.

A first conventional actuator for an optical head comprises a lens holder which holds an objective lens, a focus drive coil provided around an outer periphery of the lens holder, tracking drive coils which are flat to be provided on the focus drive coil, an actuator base having a shaft for supporting the lens holder to be moved along the shaft and rotated around the shaft, a pair of magnets provided on opposite sides of the shaft on the actuator base, and a damper spring provided on the actuator base to resiliently energize the lens holder positioning the neutral position by engaging with the lens holder, as disclosed in the Japanese Patent Kokai No. 1-178134.

In operation, driving adjusting current in tracking direction flows in a direction through the tracking drive coils, so that a tracking adjusting magnetic field is generated to link with a magnetic field of the magnets. As a result, the lens holder is rotated against the force of the damper spring around the shaft on the actuator base In a direction determined by the direction of the tracking driving current.

On the other hand, a focus adjusting current flows in a direction through the focus drive coil, so that a focus adjusting magnetic field is generated to link with the magnetic field of the magnets. As a result, the lens holder is moved up and down in direction, against the rebound force of the damper spring dependent on the direction of the focus adjusting current.

Thus, the focus and tracking adjustments of the objective lens are carried out in accordance with focus and tracking moving forces generated by the magneto-electrical forces between the generated magnetic flux and the magnetic field.

A second conventional actuator for an optical head comprises a lens holder for holding an objective lens, a pair of parallel plate springs for resiliently supporting the lens holder to move in the focus adjusting direction, a hinge for allowing the lens holder to rotate around a hinged point, a focus drive coil surrounding the plate springs, tracking drive coils which are flat to be provided on the focus drive coil, and magnets provided on opposite sides of the focus and tracking drive coils, as disclosed in the Japanese Patent Kokai No. 4-38725. The detail of the structure and operation will be later explained in FIGS. 2A and 2B.

In the first conventional actuator for an optical head, however, there are disadvantages in that the efficiency of electromagnetic force conversion is low in the tracking drive coils, because a drive force is generated only on one side of each tracking drive coil, when the tracking drive coils are moved to adjust the objective lens in the tracking direction, and that the motion amount of the objective lens relative to a driving current is non-linear, because a deviation force acts between a bearing of the lens holder and the shaft of the actuator base according to the damper spring layout. Especially, this tendency is remarkable, when an objective lens having a large focus, depth is used. This results in the difficulty in providing a predetermined precision control in the focus direction.

Further, there are disadvantages in the second conventional actuator for an optical head in that the design of providing a fitting tolerance between the hinge made of nylon and the lens holder made of polyphenylene sulfide is difficult to result in hinge deformation, that the molding of the hinge is difficult due to poor fluidity of nylon, because a hinge portion is as thin as 20 to 30 μm, and the temperature characteristics of nylon are not so well, and that a weight for moving members is large due to counter balances; spacial limitation in arranging a magnetic circuit and the focus and tracking drive coils for the structural reason, therefore, it is difficult to increase a drive sensitivity, especially, that of the tracking drive coils, and to stabilize the temperature characteristics of the focus and tracking drive coils.

SUMMARY OF THE INVENTION

Accordingly, it is an object of the invention to provide an actuator for an optical head in which the efficiency of electromagnetic force conversion is increased for tracking drive coils.

It is a further object of the invention to provide an actuator for an optical head in which a linearity between a motion amount of an objective lens and a drive current is obtained.

It is a still further object of the invention to provide an actuator for an optical head in which the structure is simple, the fabrication is easy, the weight is light, and the size is small.

It is a yet still further object of the invention to provide an actuator for an optical head in which the drive sensitivity is high, and the temperature characteristics are stable.

According to the feature of the invention, an actuator for an optical head, comprises:

a lens holder for holding an objective lens;

a focus driving coil wound on an outer periphery of said lens holder, a magnetic flux generated by said focus drive coil passing therethrough in a direction of a focus adjustment;

first and second tracking drive coils being thin and circular to be provided on said focus drive coil, magnetic fluxes generated by said first and second tracking drive coils passing therethrough in a direction orthogonal to said direction of said focus adjustment to the disc;

an actuator base having a shaft for supporting said lens holder to be moved down and up along said shaft and rotated around said shaft;

a first magnet provided on said actuator base to apply a magnetic field to said first and second tracking drive coils, said first magnet facing adjacent half portions of said first and second tracking drive coils; and second and third magnets which are provided on said actuator base to apply magnetic fields to said focus drive coil and said first and second tracking drive coils, said second magnet facing an outer half portion of said first tracking drive coil and a first predetermined portion of said focus drive coil, said third magnet facing an outer half portion of said second tracking drive coil, and a second predetermined portion of said focus drive coil, said magnetic field of said first magnet being opposite in direction to said magnetic fields of said second and third magnets, and said outer half portions of said first and second tracking drive coils being opposite to said adjacent half portions thereof.

According to another feature of the invention, an actuator for an optical head, comprises:

a lens holder for holding an objective lens;

a focus driving coil wound on an outer periphery of said lens holder, a magnetic flux generated by said focus drive coil passing therethrough in a direction of a focus adjustment;

first and second tracking drive coils being thin and circular to be provided on said focus drive coil, magnetic fluxes generated by said first and second tracking drive coils passing therethrough in a direction orthogonal to said direction of said focus adjustment to the disc;

an actuator base for supporting said lens holder by a pair of upper and lower triangular plate springs parallel to each other, each of said plate springs having first to third apex points, said first apex points of said plate springs being fixed to rotative axes on top and bottom planes of said lens holder, and said second and third apex points of said plate springs being fixed said actuator base;

a first magnet provided on said actuator base to apply a magnetic field to said first and second tracking drive coils, said first magnet facing adjacent half portions of said first and second tracking drive coils; and second and third magnets which are provided on said actuator base to apply magnetic fields to said focus drive coil and said first and second tracking drive coils, said second magnet facing an outer half portion of said first tracking drive coil and a first predetermined portion of said focus drive coil, said third magnet facing an outer half portion of said second tracking drive coil, and a second predetermined portion of said focus drive coil, said magnetic field of said first magnet being opposite in direction to said magnetic fields of said second and third magnets, and said outer half portions of said first and second tracking drive coils being opposite to said adjacent half portions thereof.

BRIEF DESCRIPTION OF THE DRAWINGS

The invention will be explained in more detail in conjunction with appended drawings, wherein.

DESCRIPTION OF THE PREFERRED EMBODIMENTS

Before explaining an actuator for an optical head in the preferred embodiment according to the invention, the aforementioned first and second conventional actuators for an optical head will be again explained.

Figure 1B:
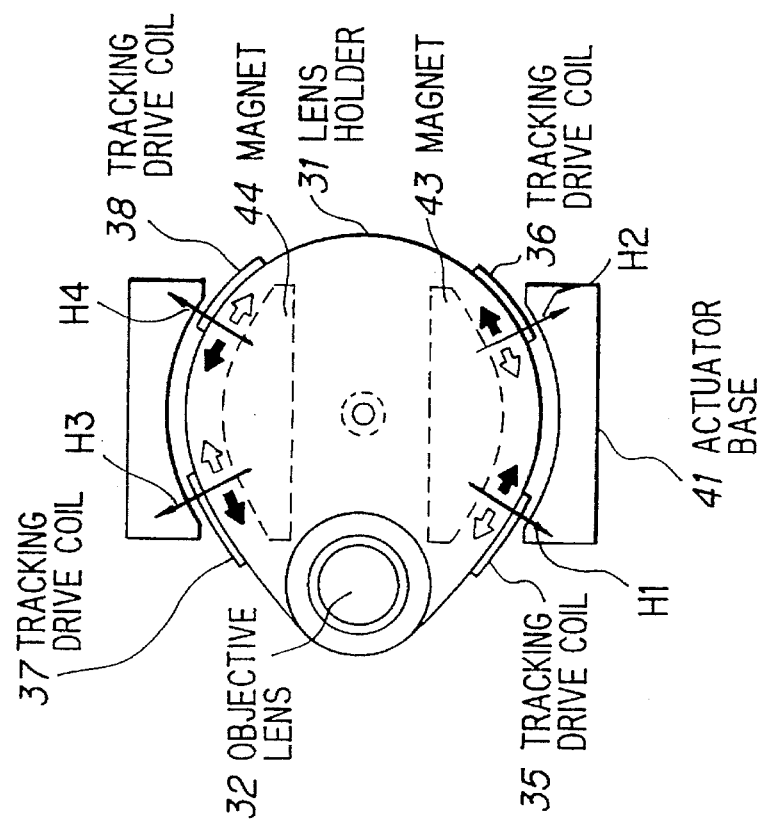
FIGS. 1A and 1B are a disassembled diagram and a plan view showing the first conventional actuator for an optical head.
Figure 1A:
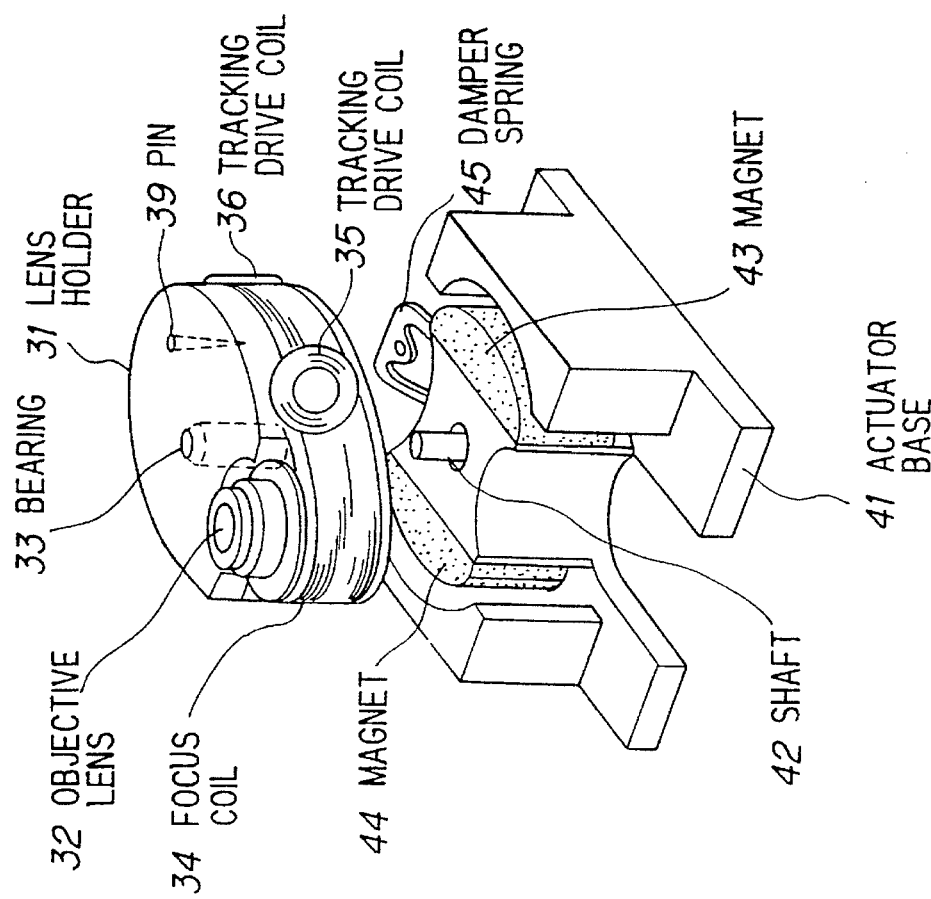

FIGS. 1A and 1B show the first conventional actuator for an optical head in which a lens holder 31 for holding an objective lens 32 is supported to move down and up and rotate by a shaft 42 of an actuator base 41. The lens holder 31 is provided with a bearing 33 for receiving the shaft 42, a focus drive coil 34 wound on an outer periphery thereof, tracking drive coils 35 to 38 mounted on the focus drive coil 34, and a pin 39 for engaging with a damper spring 45 fixed to the actuator base 41. On the other hand, a pair of magnets 44 and 45 are mounted in grooves of the actuator base 41. In the assembly of the lens holder 31 and the actuator base 41, the tracking drive coils 35 and 36 are positioned to face the edge portions of the magnet 43, and the tracking drive coils 37 and 38 are positioned to face those of the magnet 44, so that magnetic field H1 and H2 generated by the magnet 43 act on the inside half portions of the tracking drive coils 35 and 36, as indicated by arrows in FIG. 1A, and those H3 and H4 by the magnet 44 act on those of the tracking drive coils 37 and 38.

In operation, currents flow through the inside half portions of the tracking drive coils 35 to 38 in the direction of the upper to lower surfaces vertically to the drawing plane, so that electromagnetic forces as indicated by white arrows are generated. Consequently, the lens holder 31 is rotated around the shaft 42 in the clockwise direction in FIG. 1B. On the other hand, when currents flow through the inside half portions of the tracking drive coils 35 to 38 in the direction of the lower to upper surfaces vertically to the drawing plane, so that electromagnetic forces as indicated by black arrows are generated. Consequently, the lens holder 31 is rotated around the shaft 42 in the counter-clockwise direction in FIG. 1B. Thus, the tracking adjustment is carried out by controlling the direction of currents supplied to the tracking drive coils 35 to 38.

On the other hand, the focus adjustment for objective lens to disc is carried out by controlling the supplying current to the focus coil 34. That is, the lens holder 31 is moved down and up along the shaft 42.

Figure 2A:
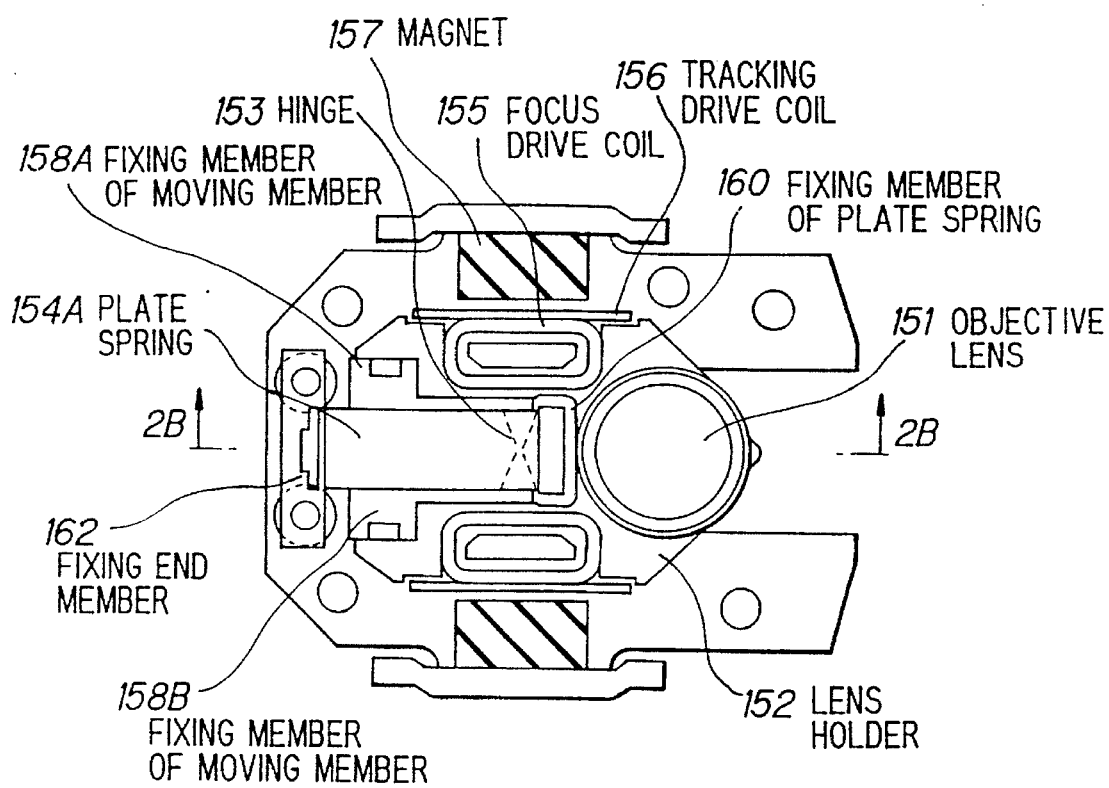
FIGS. 2A and 2B are a plan view and a cross-sectional view (taken along the line 2B—2B) showing the second conventional actuator for an optical head.
Figure 2B:
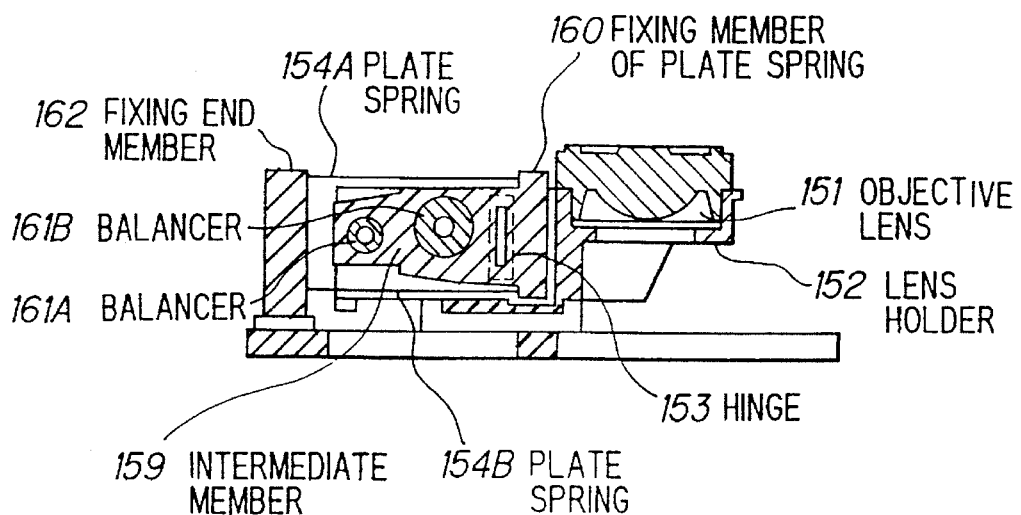

FIGS. 2A and 2B show the second conventional actuator for an optical head. In this actuator for an optical head, there are provided a fixing end member 162, metal plate springs 154A and 154B, and an intermediate member 159 having a hinge 153, wherein the intermediate member 159 is made of plastic, and the metal plate springs 154A and 154B are fixed by a fixing member 160, while members 158A and 158B for fixing moving members are provided on the opposite side of the fixing member 160 relative to the hinge 153. On the intermediate member 159, counter-balancers 161A and 161B are provided. An objective lens 151 is provided on a lens holder 152, and a focus drive coils 155 is wound on the lens holder 152 as shown in FIG. 2A. On the focus drive coil 155, tracking drive coils 156 are provided, and a pair of magnets 157 are provided on the actuator base, as shown in FIG. 2A, common to the focus and tracking drive coils 155 and 156.

In operation, a current flows through the focus drive coil 155, so that an electromagnetic force is generated in accordance with the interlinkage between a magnetic field of the magnets 157 and that generated by the focus drive coil 155. Thus, the metal plate springs 154A and 154B are resiliently deformed to carry out the focus adjustment. On the other hand, currents flow through the tracking drive coils 156, so that an electromagnetic force is generated in the similar manner to the focus drive coil 155. Consequently, the lens holder 152 is moved around the hinge 153 to carry out the tracking adjustment.

Next, an actuator for an optical head in the first preferred embodiment according to the invention will be explained in FIGS. 3A and 3B.

In the actuator for an optical head, an objective lens 12 is held on a lens holder 11 of an elongated circular configuration having a bearing 13. The lens holder 11 is supported on an actuator base 21 by receiving a shaft 22 thereof into the bearing 13, so that the lens holder 11 is rotated around the shaft 22 and moved down and up along the shaft 22. Around a lower portion of the lens holder 11 having a straight line side and an approximately circular configuration, a focus drive coil 14 is provided, and flat and rectangular tracking drive coils 17 and 18 are provided on the focus drive coil 14 by positioning magnetic chips 15 and 16 therebetween. On the other hand, magnets 23, 24 and 25 of polarities as indicated by the letters N and S are provided on inner surfaces of walls for the actuator base 21, such that the magnet 24 is positioned to face the adjacent half portions of the tracking drive coils 17 and 18, and the magnets 23 and 25 are positioned to face the approximately circular portions of the focus drive coil 14, and the outer half portions of the tracking drive coils 17 and 18. In this structure, a 45° mirror (not shown) for reflecting a laser light may be provided under the objective lens 12 and in front of the straight line side of the focus drive coil 14 to make the whole structure thin and small.

In operation, magnetic fields H1, H2, H3, H4 and H5 are generated by the magnets 23, 24 and 25, wherein the magnetic fields H3 and H4 generated by the magnet 24 are opposite in direction to those H1, H2, H5 and H6. Here, currents flow through the half portions of the tracking drive coils 17 and 18, on which the magnetic fields H3 and H4 of the magnet 24 act, in the direction of the upper to lower surfaces vertically to the drawing plane, so that the currents flow through the remaining half portions of the tracking drive coils 17 and 18, on which the magnetic fields H2 and H5 of the magnets 23 and 25 act, in the direction of the lower to upper surfaces vertically to the drawing plane. Consequently, drive forces are generated in the clockwise direction by the both half portions of the tracking drive coils 17 and 18. As a result, the efficiency of electromagnetic force conversion becomes twice as compared to the first conventional actuator for an optical head. On the other hand, currents flow through the tracking drive coil 17 and 18 in the opposite direction to that in the above operation, the lens holder 11 is rotated in the counter-clockwise direction. Thus, the servo driving in the tracking direction is carried out by increased drive forces.

In the focus adjustment, a current flows through the focus drive coil 14, so that the lens holder 11 is moved down and up along the shaft 22 dependent on the direction of the flowing current.

When no current flow through the focus and tracking drive coils 14, 17 and 18, the magnetic chip 15 and 16 are applied with the magnetic fields H2, H3, H4 and H5 to act as magnetic springs, so that the lens holder 11 is magnetically enforced to take a neutral position. As a result, a well balanced force acts between the bearing 13 of the lens holder 11 and the shaft 22 of the actuator base 21. This results in the improvement of axis stabilization, so that a motion amount of the lens holder 11 relative to a drive current is more linear than in the first conventional actuator for an optical head using a damper spring.

Figure 3A:
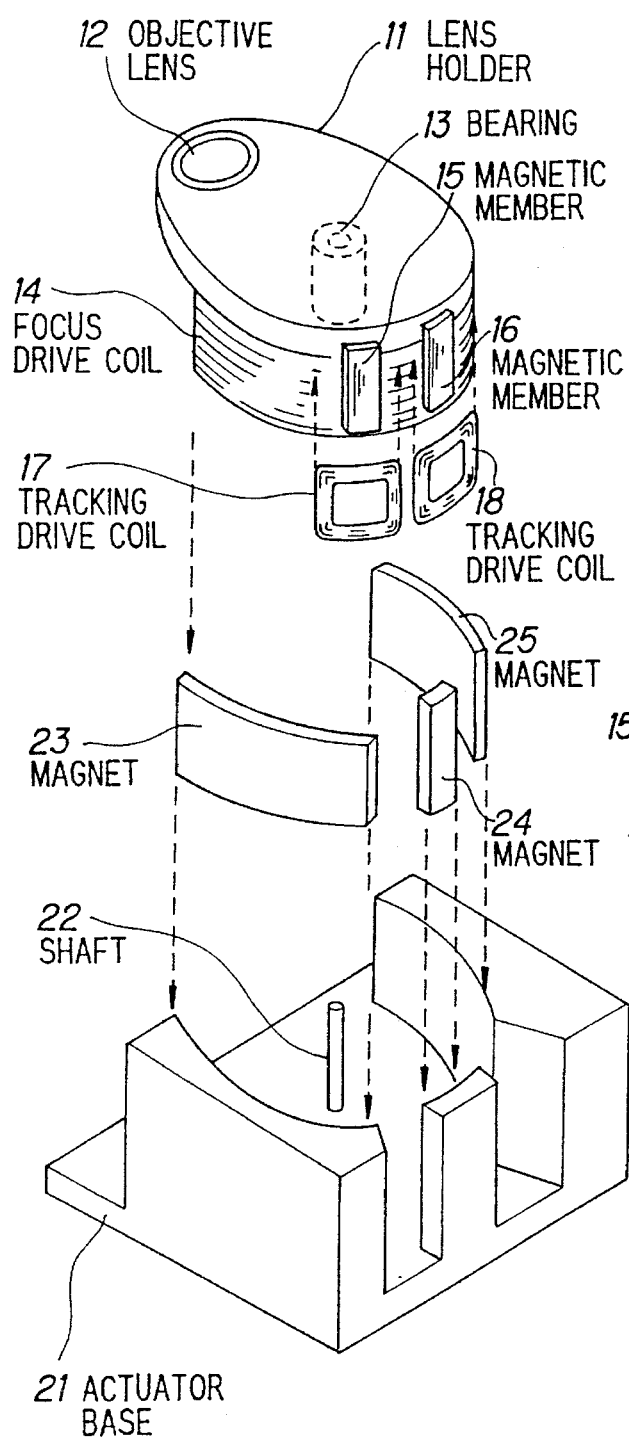
FIGS. 3A and 3B are a disassembled diagram and a plan view showing an actuator for an optical head in a first preferred embodiment according to the invention.
Figure 3B:
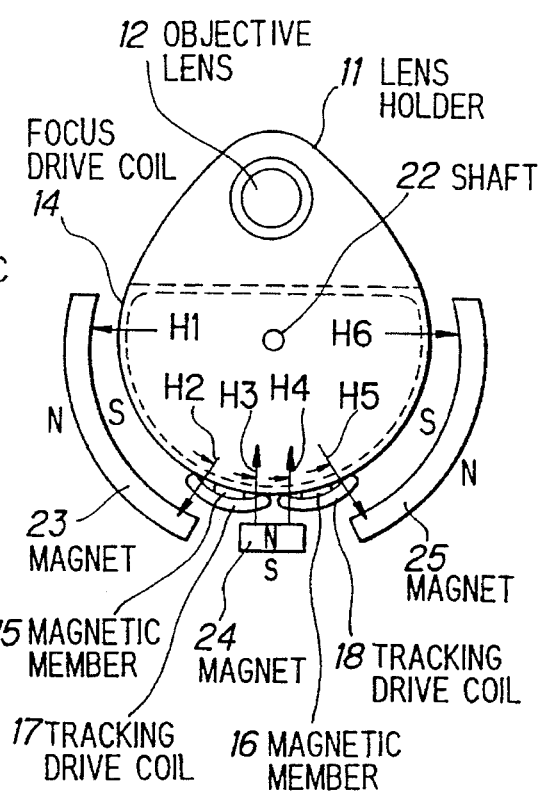
Figure 4:
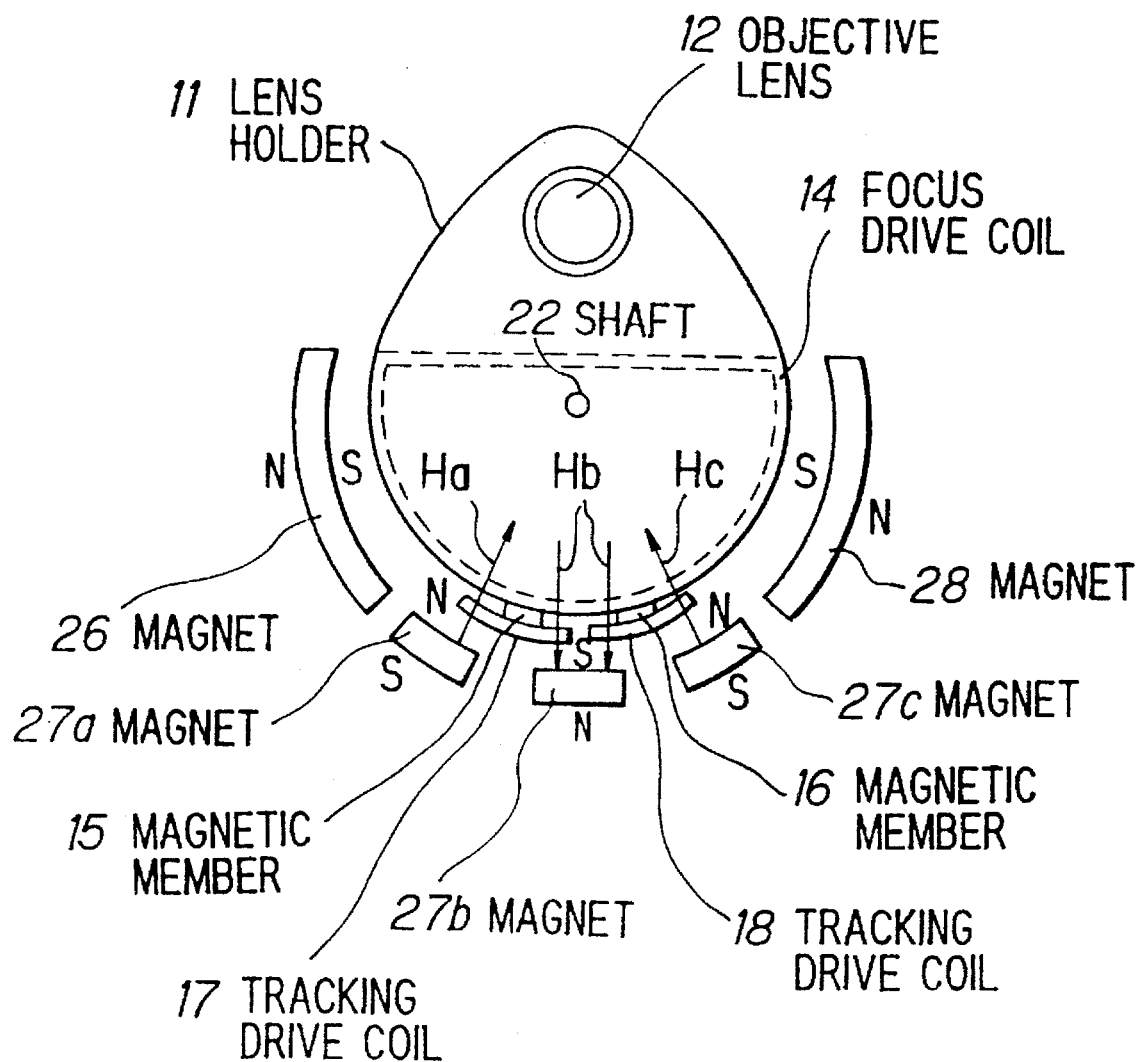
FIG. 4 is a plan view showing an actuator for an optical head in a second preferred embodiment according to the invention.

FIG. 4 shows an actuator for an optical head in the second preferred embodiment according to the invention, wherein like parts are indicated by like reference numerals as used in FIGS. 3A and 3B.

In the second preferred embodiment, magnets 26 and 28 are provided to face the approximately circular portions of the focus drive coil 14, and magnets 27a, 27b and 27c are provided to face the outer half portions and the adjacent half portions of the tracking drive coils 17 and 18, wherein the letters N and S indicate the polarities of the magnets 26 to 28, and Ha, Hb and Hc are magnetic fields generated by the magnets 27a, 27b and 27c.

As understood from the distribution of the magnetic fields Ha, Hb and Hc which are different only in direction from those in FIG. 3B, the same results are obtained in regard to a drive force in the tracking adjustment and the linearity in motion of the lens holder 11.

Figure 5:
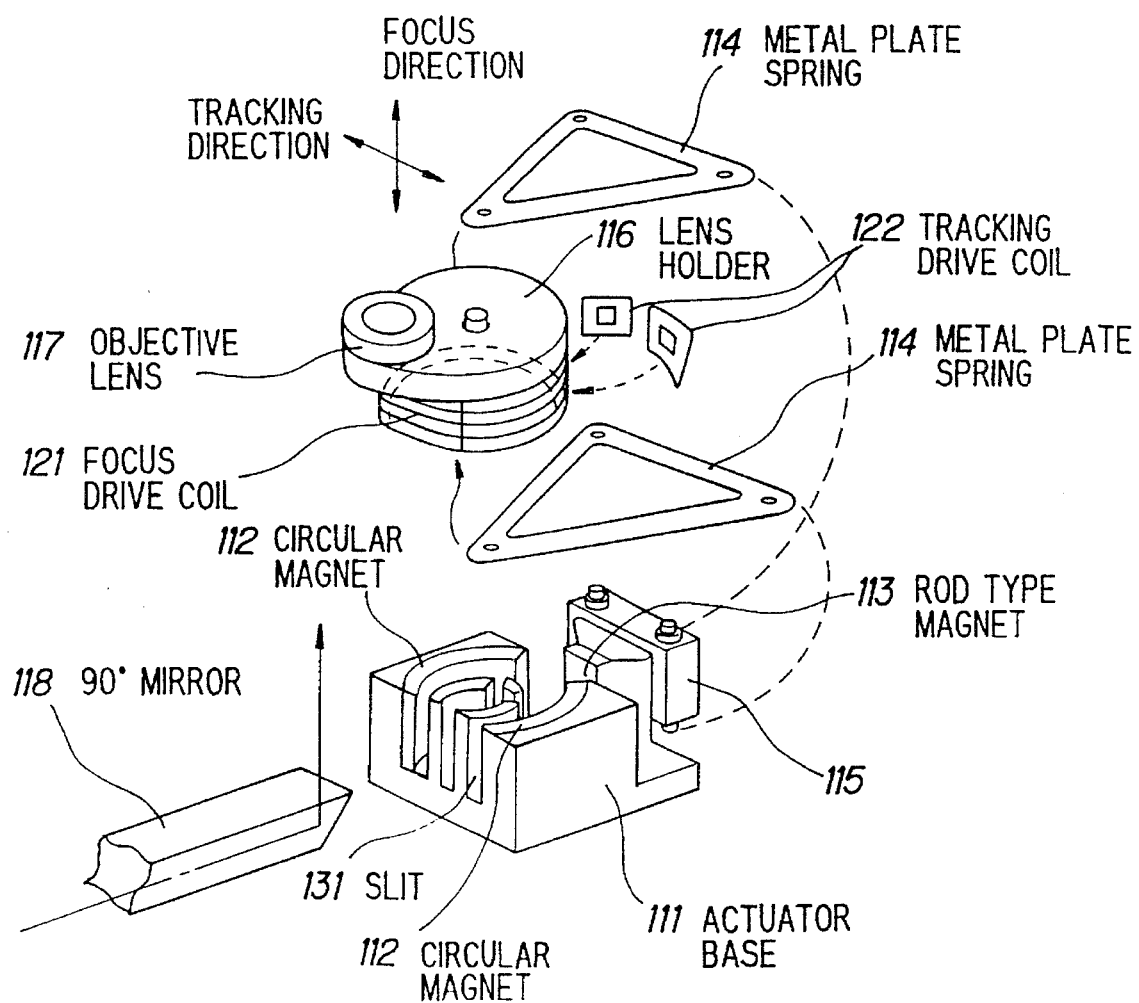
FIG. 5 is a disassembled diagram showing an actuator for an optical head in a third preferred embodiment according to the invention.

FIG. 5 shows an actuator for an optical head in the third preferred embodiment according to the invention.

In the actuator for an optical head, an actuator base 111 is provided with circular magnets 112 and a rod magnet 113, by which a magnetic circuit is obtained, and a stand 115 for supporting triangle metal plate springs 114 is attached to one side of the actuator base 111 by solder or adhesive. On the other hand, a lens holder 116 is provided with an objective lens 117 on an elongated portion and a focus drive coil 121 wound on an outer periphery of a lower portion having a straight line side and a circular configuration. Further, flat tracking drive coils 122 shaped to be circular are attached on the focus drive coil 121 on the opposite side to a side on which the objective lens 113 is provided so as to also function as a weight balance counter. Under the objective lens 117, a 90° mirror 118 is positioned to reflect a laser light.

Figure 6A:
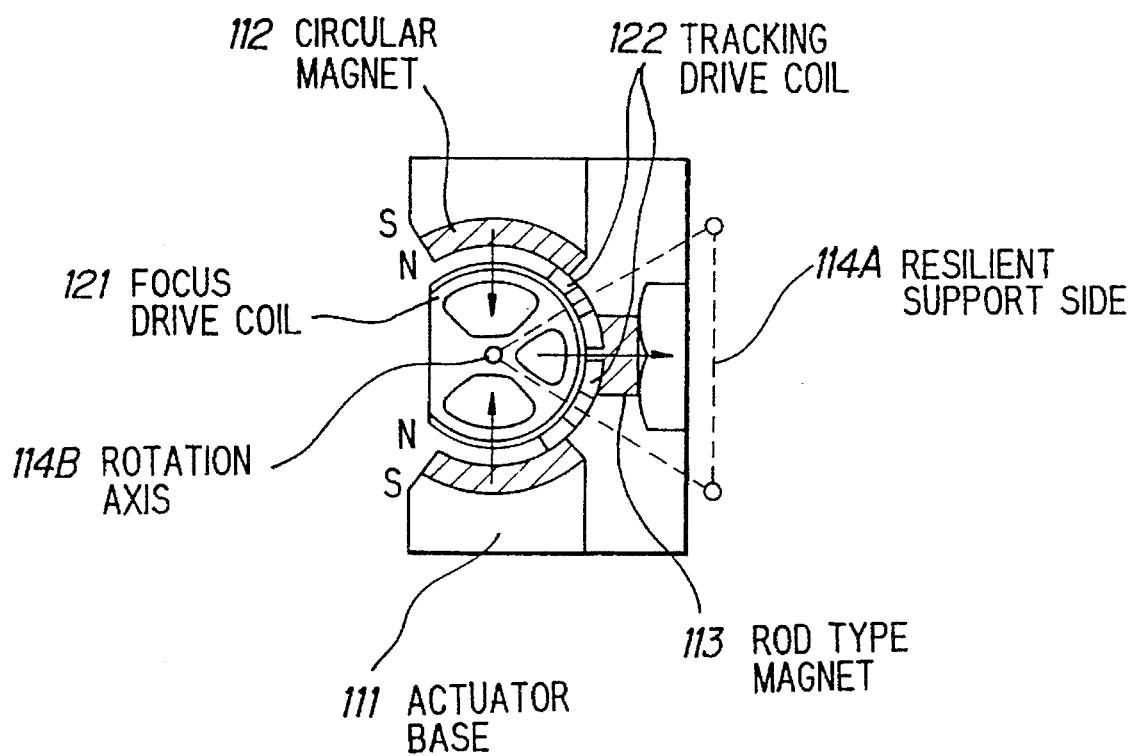
FIGS. 6A and 6B are explanatory views showing an actuator base and rectangular coils in the third preferred embodiment.
Figure 6B:
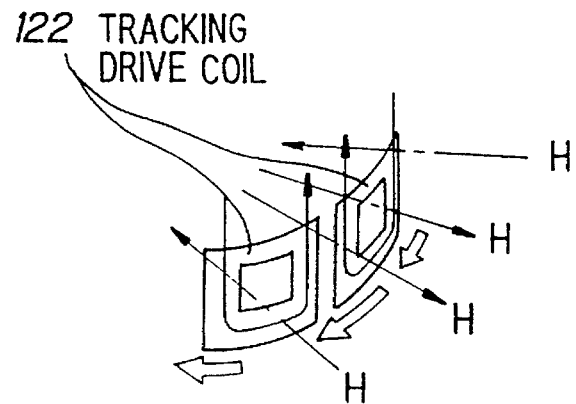

FIGS. 6A and 6B show the actuator for an optical head in the third preferred embodiment in a different aspect.

The circular magnets 112 apply a magnetic field to the focus and tracking drive coil 121 and 122 in accordance with an approximately closed magnetic path, and the rod magnet 113 applies a magnetic field to the tracking driving coils 122. In order to provide closed magnetic paths, the actuator base 111 functions as a magnetic york to increase a magnetic field applying factor. As shown in FIG. 6B, a magnetic field H is applied to two sides of each rectangular tracking coil 122 among four sides thereof by the circular and rod magnets 112 and 113 wherein currents as indicated by solid line arrows flow through the tracking coils 122, so that a rotative force as indicated by white arrows is generated to carry out the tracking adjustment.

FIGS. 7A to 7D show the actuator for an optical head in the third preferred embodiment in more detail.

Figure 7A:
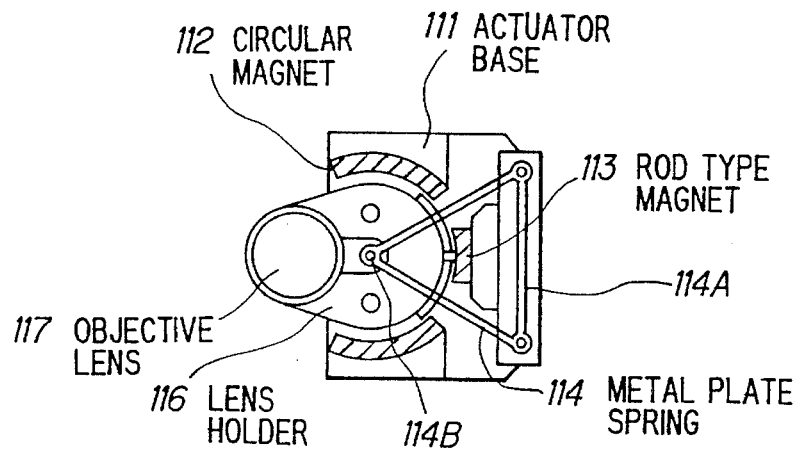
FIGS. 7A to 7D are explanatory views showing the actuator for an optical head in the third preferred embodiment and a magnetic circuit thereof.
Figure 7B:
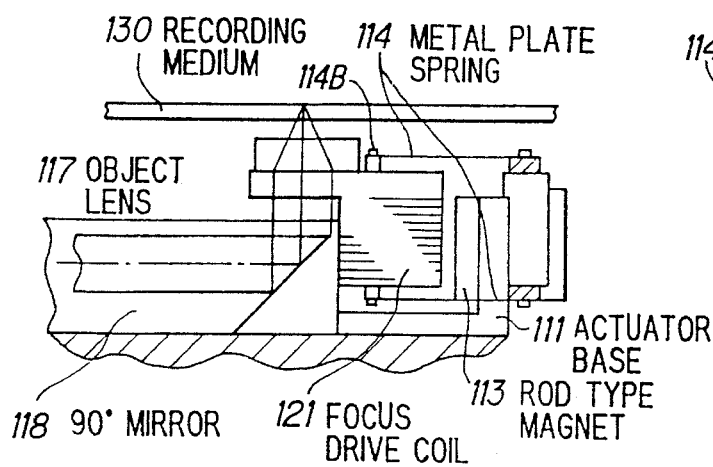
Figure 7C:
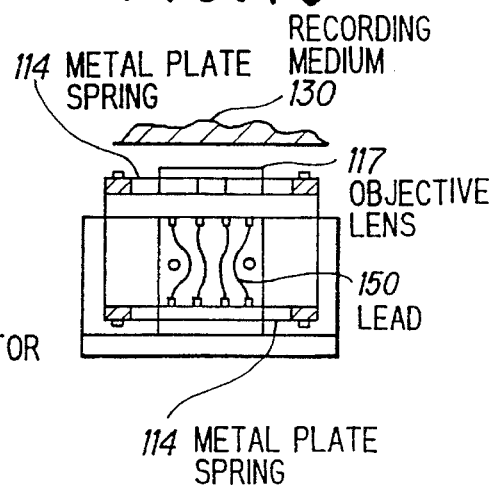
Figure 7D:
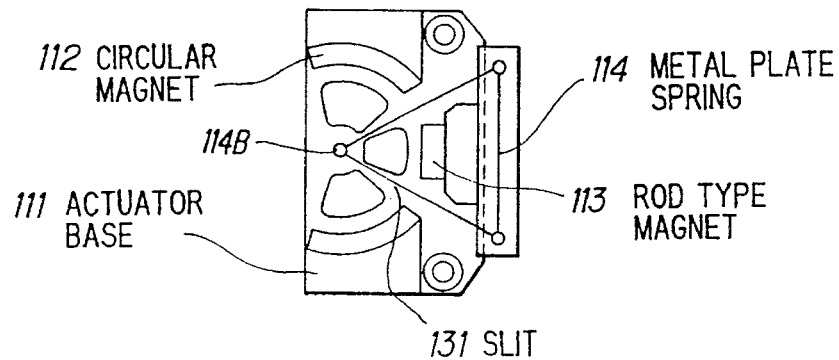

The rotative axis 114B of the lens holder 116 is positioned with a predetermined distance from the light axis of the objective lens 117. For this structure, a tracking distance is obtained by the multiplication of the predetermined distance and a rotative angle of the lens holder 116. As understood from the illustration, the lens holder 116 is supported at the rotative axis 114B by a pair of the metal plate springs 114, wherein apex points of the metal plate springs 114 are fixed to the rotative axis 114B, and the resilient support sides of the metal plate springs 114 are supported on upper and lower sides of the stand 115, respectively. The actuator base 111 is provided with slits 131, into which the lower metal plate spring 114 is inserted as best shown in FIG. 7D. In the third preferred embodiment, the lower metal plate spring 114 is connected to leads 150 for supplying currents to the focus and tracking drive coils 121 and 122, a best shown in FIG. 7C.

Figure 8A:
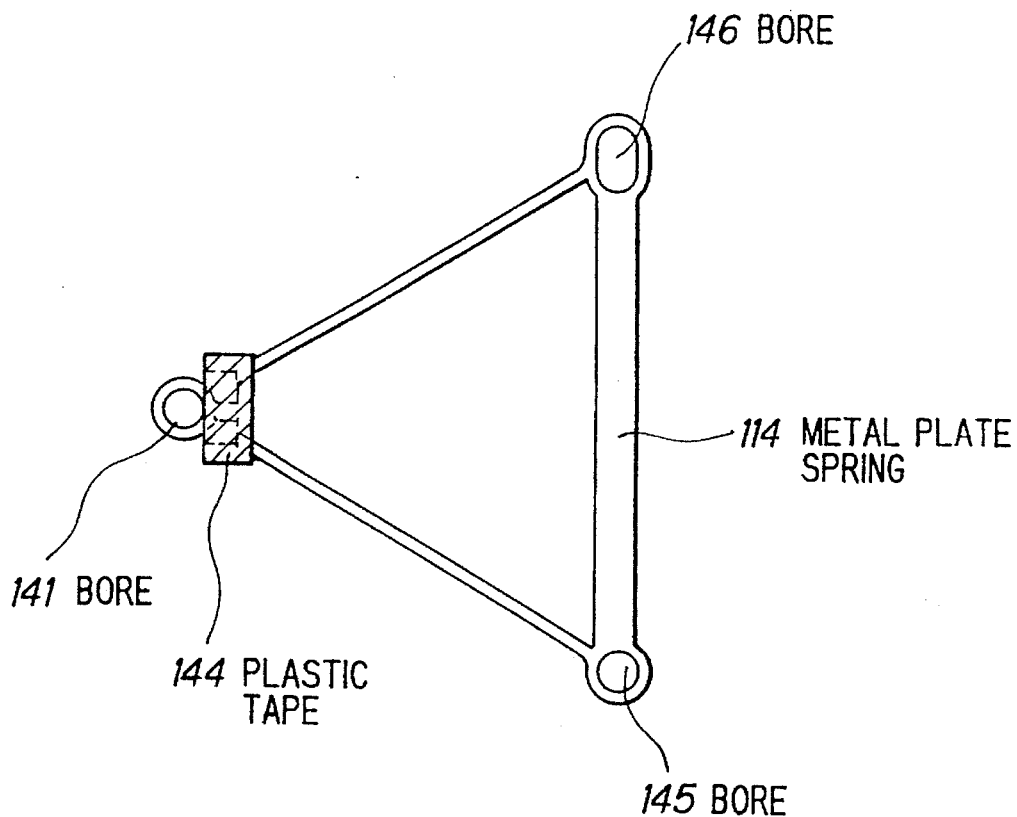
FIG. 8 is a plan view showing a metal plate spring in the third preferred embodiment.
Figure 8B:
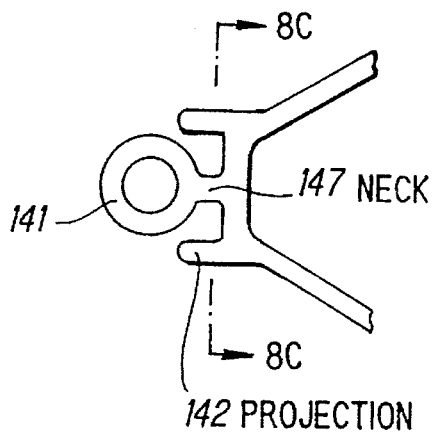
Figure 8C:
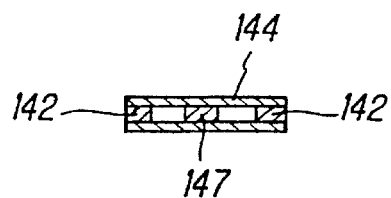

FIGS. 8A to 8C show a metal plate spring 114 to be used for an actuator for an optical head as explained in the third preferred embodiment.

The metal plate spring 114 is shaped to have a bore 141 to be attached to the rotative axis 114B of the lens holder 16 by adhesive or solder, a projections 142 provided on both sides of a neck 147, and bores 145 and 146 to be fixed to the stand 115. As shown in FIG. 8A and 8C, a portion of the projections 142 and the neck 147 is sandwiched to absorb natural frequency vibrations by plastic tapes 144.

In the preferred embodiment, the tracking adjustment is carried out by torsion of the neck portion of the parallel metal plate springs 114, and the focus adjustment is carried out by resilient deformation of two slant sides between the bores 141 and 145 and between the bores 141 and 146.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An actuator for an optical head, comprising:

a lens holder for holding an objective lens;

a focus drive coil disposed on an outer periphery of said lens holder, said focus drive coil for generating a magnetic flux passing therethrough in a direction of a focus adjustment;

first and second tracking drive coils provided on said focus drive coil, said first and second tracking drive coils for generating magnetic fluxes passing therethrough in a direction orthogonal to said direction of said focus adjustment;

an actuator base having a shaft for supporting said lens holder, said lens holder adapted to be moved down and up along said shaft and rotated around said shaft;

a first magnet provided on said actuator base for applying a magnetic field to said first and second tracking drive coils, said first magnet facing adjacent half portions of said first and second tracking drive coils; and second and third magnets provided on said actuator base for applying magnetic fields to said focus drive coil and said first and second tracking drive coils, said second magnet facing an outer half portion of said first tracking drive coil and a first predetermined portion of said focus drive coil, said third magnet facing an outer half portion of said second tracking drive coil and a second predetermined portion of said focus drive coil, said magnetic field of said first magnet being opposite in direction to said magnetic fields of said second and third magnets, and said outer half portions of said first and second tracking drive coils being opposite to said adjacent half portions thereof;

said focus drive coil and said first and second tracking drive coils cooperate with said first, second and third magnets to move said lens holder up and down said shaft and to rotate said lens holder about said shaft.

2. An actuator for an optical head, according to claim 1, wherein:

said lens holder includes a first portion at its top and a second portion at its bottom, said first portion being an elongated circular configuration defined by a long radius and a short radius crossing at a center point and orthogonal to each other, and having an area for holding said objective lens at an end on said long radius, and said second portion having said outer periphery on which is disposed said focus drive coil, said outer periphery being defined by a straight line and a circular line, said straight line providing a space for positioning a light reflecting mirror.

3. An actuator for an optical head, comprising:

a lens holder for holding an objective lens;

a focus drive coil disposed on an outer periphery of said lens holder, said focus drive coil for generating a magnetic flux passing therethrough in a direction of a focus adjustment;

first and second tracking drive coils provided on said focus drive coil, said first and second tracking drive coils for generating magnetic fluxes passing therethrough in a direction orthogonal to said direction of said focus adjustment;

an actuator base having a shaft for supporting said lens holder, said lens holder adapted to be moved down and up along said shaft and rotated around said shaft;

a first magnet provided on said actuator base for applying a magnetic field to said first and second tracking drive coils, said first magnet facing adjacent half portions of said first and second tracking drive coils;

second and third magnets provided on said actuator base for applying magnetic fields to said focus drive coil and said first and second tracking drive coils, said second magnet facing an outer half portion of said first tracking drive coil and a first predetermined portion of said focus drive coil, said third magnet facing an outer half portion of said second tracking drive coil and a second predetermined portion of said focus drive coil, said magnetic field of said first magnet being opposite in direction to said magnetic fields of said second and third magnets, and said outer half portions of said first and second tracking drive coils being opposite to said adjacent half portions thereof; and first and second magnetic chips interposed between said first tracking drive coil and said focus drive coil and between said second tracking drive coil and said focus drive coil.

4. An actuator for an optical head, comprising:

a lens holder for holding an objective lens;

a focus drive coil disposed on an outer periphery of said lens holder, said focus drive coil for generating a magnetic flux passing therethrough in a direction of a focus adjustment;

first and second tracking drive coils provided on said focus drive coil, said first and second tracking drive coils for generating magnetic fluxes passing therethrough in a direction orthogonal to said direction of said focus adjustment;

an actuator base having a shaft for supporting said lens holder, said lens holder adapted to be moved down and up along said shaft and rotated around said shaft;

a first magnet provided on said actuator base for applying magnetic field to said first and second tracking drive coils, said first magnet facing adjacent half portions of said first and second tracking drive coils;

second and third magnets provided on said actuator base for applying magnetic fields to said focus drive coil and said first and second tracking drive coils, said second magnet facing an outer half portion of said first tracking drive coil and a first predetermined portion of said focus drive coil, said third magnet facing an outer half portion of said second tracking drive coil and a second predetermined portion of said focus drive coil, said magnetic field of said first magnet being opposite in direction to said magnetic fields of said second and third magnets, and said outer half portions of said first and second tracking drive coils being opposite to said adjacent half portions thereof;

first and second magnetic chips interposed between said first tracking drive coil and said focus drive coil and between said second tracking drive coil and said focus drive coil; and said lens holder including a first portion and a second portion, said first portion being an elongated circular configuration defined by a long radius and a short radius crossing at a center point and orthogonal to each other, and having an area for holding said objective lens at an end on said long radius, and said second portion having said outer periphery on which is disposed said focus drive coil, said outer periphery being defined by a straight line and a circular line, said straight line providing a space for positioning a light reflecting mirror.

5. An actuator for an optical head, comprising:.

a lens holder for holding an objective lens;

a focus drive coil disposed on an outer periphery of said lens holder, said focus drive coil for generating a magnetic flux passing therethrough in a direction of a focus adjustment;

first and second tracking drive coils provided on said focus drive coil, said first and second tracking drive coils for generating magnetic fluxes passing therethrough in a direction orthogonal to said direction of said focus adjustment;

an actuator base having a shaft for supporting said lens holder, said lens holder adapted to be moved down and up along said shaft and rotated around said shaft;

a first magnet provided on said actuator base for applying a magnetic field to said first and second tracking drive coils, said first magnet facing adjacent half portions of said first and second tracking drive coils;

second and third magnets provided on said actuator base for applying magnetic fields to said focus drive coil and said first and second tracking drive coils, said second magnet facing an outer half portion of said first tracking drive coil and a first predetermined portion of said focus drive coil, said third magnet facing an outer half portion of said second tracking drive coil and a second predetermined portion of said focus drive coil, said magnetic field of said first magnet being opposite in direction to said magnetic fields of said second and third magnets, and said outer half portions of said first and second tracking drive coils being opposite to said adjacent half portions thereof;

said second magnet is separated into fourth and fifth magnets, said fourth magnet facing said outer half portion of said first tracking drive coil and a portion of said first predetermined portion of said focus drive coil, and said fifth magnet facing a remaining portion of said first predetermined portion of said focus drive coil; and said third magnet is separated into sixth and seventh magnets, said sixth magnet facing said outer half portion of said second tracking drive coil and a portion of said second predetermined portion of said focus drive coil, and said seventh magnet facing a remaining portion of said second predetermined portion of said focus drive coil.

6. An actuator for an optical head, comprising:

a lens holder for holding an objective lens;

a focus drive coil disposed on an outer periphery of said lens holder, said focus drive coil for generating a magnetic flux passing therethrough in a direction of a focus adjustment;

first and second tracking drive coils provided on said focus drive coil, said first and second tracking drive coils for generating magnetic fluxes passing therethrough in a direction orthogonal to said direction of said focus adjustment;

an actuator base for supporting said lens holder by a pair of upper and lower triangular plate springs parallel to each other, each of said plate springs having first to third apex points, said first apex points of said plate springs being fixed to rotative axes on top and bottom planes of said lens holder, and said second and third apex points of said plate springs being fixed to said actuator base;

a first magnet provided on said actuator base for applying a magnetic field to said first and second tracking drive coils, said first magnet facing adjacent half portions of said first and second tracking drive coils; and second and third magnets provided on said actuator base for applying magnetic fields to said focus drive coil and said first and second tracking drive coils, said second magnet facing an outer half portion of said first tracking drive coil and a first predetermined portion of said focus drive coil, said third magnet facing an outer half portion of said second tracking drive coil and a second predetermined portion of said focus drive coil, said magnetic field of said first magnet being opposite in direction to said magnetic fields of said second and third magnets, and said outer half portions of said first and second tracking drive coils being opposite to said adjacent half portions thereof.

7. An actuator for an optical head, according to claim 6, wherein:

each of said upper and lower triangular plate springs is provided with projections adjacent to said first apex point.

8. An actuator for an optical head, according to claim 7, wherein:

each of said upper and lower triangular plate springs is sandwiched by plastic tapes at a portion of said springs having said projections.

9. An actuator for an optical head, according to claim 6, wherein:

said actuator base is provided with a stand having top and bottom sides on which said second and third apex points of said plate springs are fixed.

* * * * *